US 7,002,595 B2

(12) United States Patent
Wilson

(10) Patent No.: US 7,002,595 B2
(45) Date of Patent: Feb. 21, 2006

(54) PROCESSING OF COLOR GRAPHICS DATA

(75) Inventor: Sophie Wilson, Cambridge (GB)

(73) Assignee: Broadcom Corporation, Irvine, CA (US)

(*) Notice: Subject to any disclaimer, the term of this patent is extended or adjusted under 35 U.S.C. 154(b) by 345 days.

(21) Appl. No.: 10/263,664

(22) Filed: Oct. 4, 2002

(65) Prior Publication Data

US 2004/0086183 A1     May 6, 2004

(51) Int. Cl.
*G09G 5/02*     (2006.01)
(52) U.S. Cl. ............... 345/604; 382/164; 382/304; 382/194
(58) Field of Classification Search ........... 346/604; 382/194, 164, 304; 345/604
See application file for complete search history.

(56) References Cited

U.S. PATENT DOCUMENTS

| | | | | |
|---|---|---|---|---|
| 5,227,863 A | * | 7/1993 | Bilbrey et al. | ............... 348/578 |
| 5,930,386 A | * | 7/1999 | Saito | ............... 382/166 |
| 5,995,149 A | * | 11/1999 | Saunders et al. | ...... 375/240.18 |
| 6,189,064 B1 | | 2/2001 | MacInnis et al. | |
| 6,487,308 B1 | * | 11/2002 | Ulichney et al. | ........... 382/162 |
| 6,674,479 B1 | * | 1/2004 | Cook et al. | ................. 348/453 |

FOREIGN PATENT DOCUMENTS

| | | |
|---|---|---|
| EP | 1 162574 A2 | 12/2001 |
| GB | 2 352 065 | 1/2001 |
| GB | 2 352 066 | 1/2001 |
| GB | 2 352 308 | 1/2001 |
| GB | 2 352 536 | 1/2001 |
| GB | 2 355 084 | 4/2001 |

OTHER PUBLICATIONS

"Encyclopedia of Computer Science", Third Edition, 1993, Edited by Anthony Ralston and Edwin Reilly, pp. 1016-1018, ISBN: 0-442-27679-6.*
"The Computer Science & Egineering Handbook", 1997, Editor in Chief: Allen B. Tucker, Jr., pp. 483-486, ISBN: 0-8493-2909-4.*

* cited by examiner

*Primary Examiner*—Almis R. Jankus
*Assistant Examiner*—Jon Hadidi
(74) *Attorney, Agent, or Firm*—Sterne, Kessler, Goldstein & Fox PLLC

(57) ABSTRACT

A method is provided of processing data representing pixel color having a luminance component and color difference components. The data is divided into first and second data portions, the first data portion comprising the luminance components and the second data portion comprising the color difference components. First and second instructions from a combined instruction word, and the first and second date portions are processed in parallel using first and second parallel processors within a processor architecture, the first and second parallel processors operating according to the first and second instructions, respectively. The processed first and second data portions are combined to provide processed pixel color data. This method uses parallel processor sections to process the luminance and color difference components. The parallel processor sections can then use instructions suited to the type of data being processed, providing an efficient method of processing the graphics data.

11 Claims, 4 Drawing Sheets

8 bits

PROCESSING OF COLOR GRAPHICS DATA

FIELD OF THE INVENTION

This invention relates to the processing of graphics data, in particular data giving pixel colour information in the form of luminance data and colour difference data for each pixel.

BACKGROUND OF THE INVENTION

The use of luminance and colour difference signals to represent pixel colour information is well known. This colour representation evolved to enable backward compatibility with monochrome television sets (which process the luminance signals) and in order to provide a degree of data compression.

Using one of the accepted terminologies, the luminance data is represented as Y and the colour difference signals are represented as U and V. It has been recognised that the colour data does not need to evolve as quickly as the luminance data for a given image quality to be perceived by the viewer. This provides scope for a reduction in data volumes, and different YUV schemes have evolved. Normal VHS video uses YUV 4:1:1 data, in which four times as much Y (luminance) data is provided as U or V data. The higher quality 4:2:2 YUV data format is used in the SVHS (Super-VHS) format and in other graphics applications. In the 4:2:2 format, two times as much Y data is provided as U or V data.

The luminance data is typically an unsigned value, namely a positive value in a given range. The colour difference information is derived from the subtraction of the red (for the U data) and blue (for the V data) colour component from the luminance value, and is a signed value. Processing of the different components of the YUV data therefore must take account of the different data types (signed and unsigned).

SUMMARY OF THE INVENTION

According to the invention, there is provided a method of processing data representing pixel colour, the data for each pixel being arranged as a luminance component and colour difference components, wherein the method comprises:
  dividing the data into first and second data portions, the first data portion comprising the luminance components and the second data portion comprising the colour difference components;
  deriving first and second instructions from a combined instruction word;
  processing the first and second date portions in parallel using first and second parallel processors within a processor architecture, the first and second parallel processors operating according to the first and second instructions, respectively; and
  combining the processed first and second data portions to provide processed pixel colour data.

This method uses parallel processor sections to process the luminance and colour difference components. The parallel processor sections can then use instructions suited to the type of data being processed, providing an efficient method of processing the graphics data. The instructions are derived from a common long instruction word (LIW).

The luminance components can be arranged in lanes of an operand to which an instruction is to be applied in the first processor, and the colour difference components can be arranged in lanes of an operand to which an instruction is to be applied in the second processor. Thus, the processors may each comprise Single Instruction Multiple Data (SIMD) processors for performing operations on multiple data components simultaneously.

The data preferably comprises 4:2:2 YUV data. The first and second parallel processors may then operate on 64 bit operands, and wherein each operand for the first processor comprises eight 8 bit Y luminance components, and each operand for the second processor comprises four 8 bit U colour difference components and four 8 bit V colour difference components. The 4:2:2 data structure enables the same volume of data to be processed by the two processors as the stream of graphics data is processed.

The luminance components will typically comprise unsigned binary words and the colour difference components will typically comprise signed binary words. Different instructions can then be applied by the two processors to the signed and unsigned words.

The processing carried out may typically comprise data compression, decompression or filtering.

The invention also provides a computer system for processing data representing pixel colour, comprising:
a processor architecture comprising first and second parallel processors; and
code for:
  dividing the data into first and second data portions, the first data portion comprising luminance components and the second data portion comprising colour difference components;
  deriving first and second instructions from a combined instruction word;
  instructing the first processor to process the first data portions using the first instruction and instructing the second processor to process the second data portions using the second instruction.

This system uses two parallel processors to handle the luminance and colour difference data. Each parallel processor may effectively comprise a RISC (reduced instruction set computer) processor, for example operating on 64 bit operands.

The invention also provides a computer program for implementing the method of the invention, as well as a storage medium storing the program.

BRIEF DESCRIPTION OF THE DRAWINGS

Examples of the invention will now be described in detail with reference to the accompanying drawings, in which.

DETAILED DESCRIPTION

The invention relates to the use of a particular type of processor architecture to handle the processing of graphics data, particularly in YUV data format. One example of this type of processor architecture is the "FirePath" processor of the assignee of this application.

The structure of this processor architecture will be discussed first, but it should be understood that the specific structure is only one example of a suitable processor architecture for implementing the invention. The use of the processor for handling pixel colour data for graphics applications will then be discussed.

Figure 1:
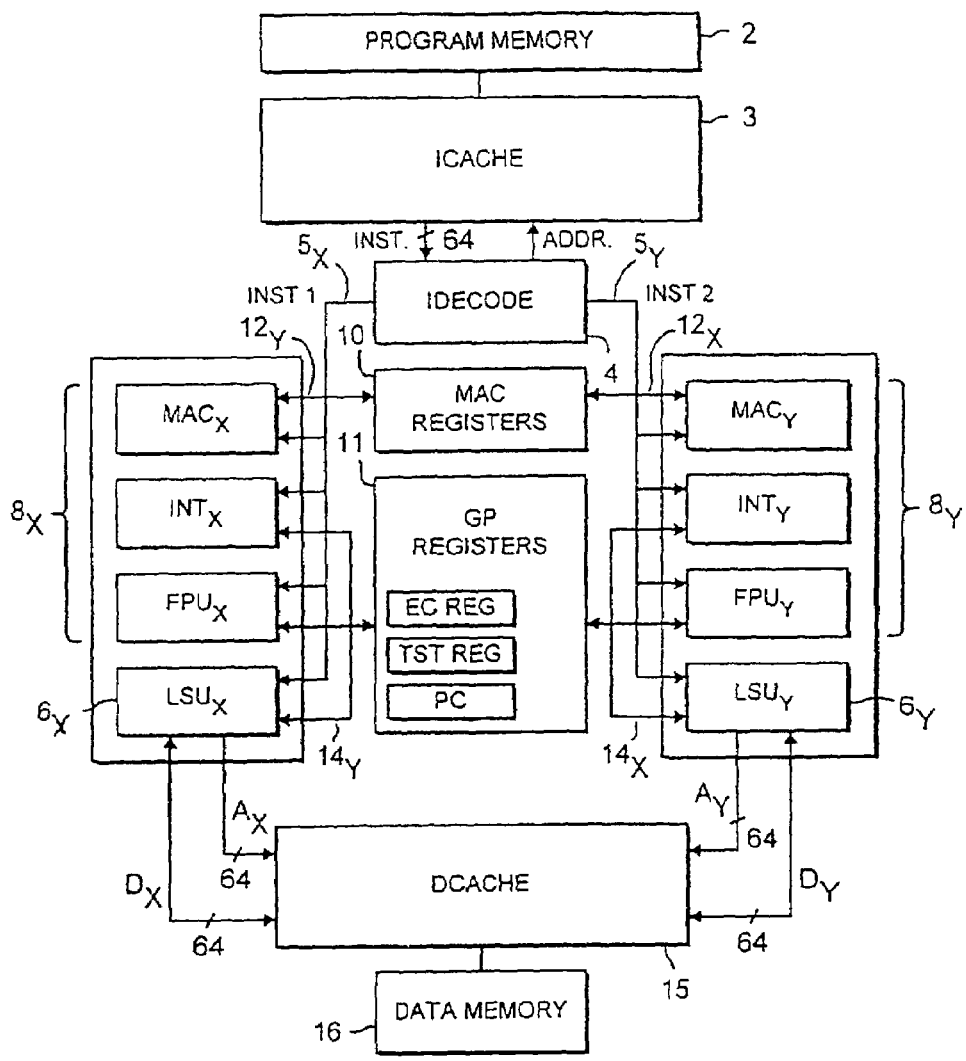
FIG. 1 is a schematic block diagram illustrating a processor.

FIG. 1 is a schematic diagram of the "Firepath" processor. A program memory 2 holds programs in the form of a plurality of instructions. The program memory 2 is connected to an instruction cache 3 which is connected to instruction fetch/decode circuitry 4. The fetch/decode circuitry issues addresses to the program memory and receives on each fetch operation a 64 bit instruction from the program memory 2 (or cache 3). Each 64 bit instruction can define two operations or a single operation. The decode unit 4 evaluates the opcode and transmits the appropriate control signals along X and Y channels $5_X$ and $5_Y$. Each channel comprises a SIMD execution unit $8_X$, $8_Y$ which includes three data processing units, MAC (Multiply-Accumulate), INT (Integer) and FPU (Floating Point Unit) and a load/store unit LSU 6. Each data processing unit MAC, INT and FPU and the load/store units LSU constitute a RISC (Reduced Instruction Set Computer) processor and operate on a single instruction multiple data (SIMD) principle according to the SIMD lane expressed in the instruction according to the following protocol, which defines the degree of packing of objects for packed data processing operations:

(B)—8 bit objects ($b_0 \ldots b_7$)
(H)—16 bit objects ($h_0 \ldots h_3$)
(W)—32 bit objects ($w_0 \ldots w_1$)
(L)—64 bit objects (1)
(S)—32 bit floating point
(D)—64 bit floating point For each channel 5, if the instruction defines a data processing operation it is supplied to the appropriate data processing unit MAC, INT or FPU and if it defines a load/store operation it is supplied to the load/store unit LSU. Data values are loaded to and from the MAC data processing units into and out of a common register file 10 which includes sixteen 64 bit special purpose registers along register access paths $12_X$, $12_Y$. Data values are loaded to and from the INT and FPU data processing units and the load/store units LSU into and out of a second, register file 11 which includes sixty-four 64-bit general purpose (GP) registers. Register access paths $14_X$, $14_Y$ are provided for these accesses. The program counter PC which indicates the current instruction can be read via one of the general purpose registers (the PC register). Another one of the general purpose registers constitutes a control and status register. The general purpose registers also include a condition code register CCreg and a test register TSTreg which are discussed in more detail in the following.

Each register access path 12,14 carries three addresses from the accessing unit, two source addresses SRC1, SRC2 and a destination address DST. In the case of data processing operations, the source addresses SRC1, SRC2 define registers in the register files 10,11 which hold source operands for processing by the data processing unit. The destination address DST identifies a destination register into which a result of data processing will be placed. The operands and results are conveyed between the register file 10 or 11 and the respective data processing unit via the access paths 12,14. In the case of load/store operations, the instruction formats allow memory access addresses to be formulated from data values held in the register.

The load/store units access a common address space in the form of a data memory 16 via a dual ported data cache DCACHE 15. For this purpose, each load/store unit has a 64 bit data bus $D_X$, $D_Y$ and a 64 bit address bus $A_X$, $A_Y$.

Figure 2:
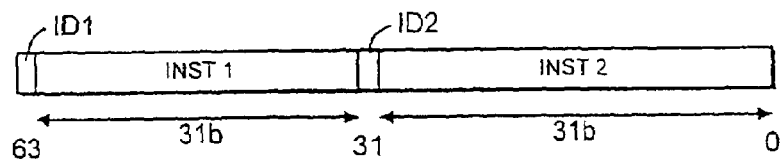
FIG. 2 is a diagram illustrating the encoding of two "packed" instructions.

The architecture supports two types of instruction, so called "long instructions" and "dual operation instructions". Each 64 bit dual operation instruction defines two 31 bit operations in the manner illustrated in FIG. 2. That is, each 64 bit sequence contains two 32 bit instruction portions labeled INST1 and INST2. Each instruction also includes a designated set of identification bits which identify the type of each operation. There are two such bits in FIG. 2 at bit locations 31 and 63 denoted ID1 and ID2 in FIG. 2. In this embodiment, operations are divided into data processing (DP) types or a load/store (LD/ST) types. The allowed combinations are two data processing operations (ID1,ID2 both set to "0"), two load/store operations (ID1, ID2 both set to "1") or one data processing and one load/store operation (ID1=0, ID2=1).

Figure 3:
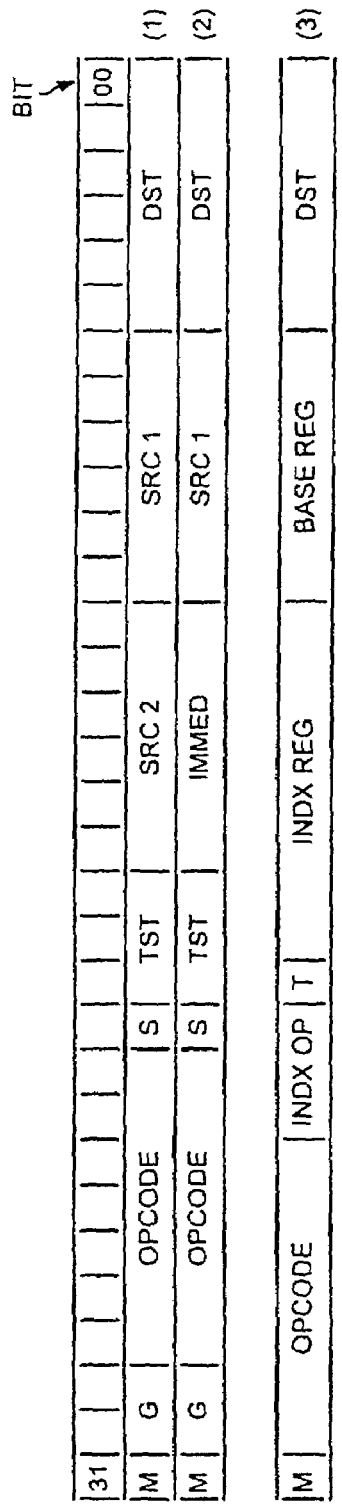
FIG. 3 illustrates a number of different 32 bit instruction formats.

FIG. 3 illustrates a number of basic formats for the 32 bit data processing portions of dual operation instructions. Each 32 bit operation requires the resources of one load/store unit, or one or more of the SIMD data processing units (MAC, INT, FPU) to execute. Thus, normally, two 32 bit operations can execute simultaneously, one in each of the X and Y channels. In the following, the X and Y channels are sometimes referred to as the right and left sides of the processor.

Format (1) defines register-register operations. Format (2) defines register-immediate operations. Format (3) defines a memory access operation. Memory access operations are not discussed further herein but it is noted that they are used to load data from memory into the register files and to provide store operations for the reverse.

The data processing instruction formats have the following fields in common. There are three identification bits, M (bit 31) and G (bits 29 and 30) which denote the nature of the data processing operation. An opcode field (bits 22 to 28)-defines the nature of the operation to be carried out, a condition setting field S (bit 21), a test register field (bits 18 to 20) and fields defining two source registers Src1, Src2 and a destination register DST. Of course, format (2) does not include a field identifying a second source register, but instead holds an immediate value. As mentioned above, the registers in the register files 10,11 can hold a number of packed objects and in that case, normally, the operation defined in the opcode of the instruction will be carried out on each "lane" of the operand, that is on each pair of corresponding packed objects in respective source registers Src1, Src2 or source register and immediate value as the case may be.

As mentioned above, the general purpose registers 11 include CC registers and test registers. The test register holds a plurality of test bytes with each byte having a format as in FIG. 4, and the least significant byte set to zero. Each of these bytes will be referred to as a Treg byte [1 . . . 7]. The Treg bytes are programmable and are set to the required values prior to instruction execution. The test register is used to allow conditional execution of instructions. Each instruction format contains a 3 bit TST field which allows a Treg byte [1 . . . 7] to be specified. If a Treg byte is not specified in the instruction, the TST field in the opcode is set to 0, and the instruction executes unconditionally. A specified byte can be modified using an ADL instruction of format (2)

which adds a byte value specified in the immediate field to a specified SIMD lane defined in the TST field (Treg byte [1 . . . 7]).

Figure 4:
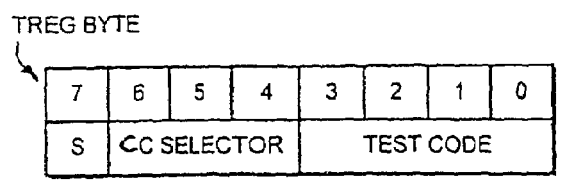
FIG. 4 illustrates the contents of a text register.

The 8-bit field of each Treg is as shown in FIG. 4.

The Condition field (bits 0 to 3) applies to all predicated instructions. It holds a 4 bit test code to allow for conditions to be tested. As discussed in more detail later, for instructions on packed objects, the condition applies to all the lanes on a per lane basis.

The four condition flags are:

N (Negative flag—bit 3)

Z (Zero flag—bit 2)

C (Carry flag—bit 1)

V (Overflow flag—bit 0)

These four bits give rise to 16 test conditions (see Table 1).

TABLE 1

| Opcode | Mnemonic | Meaning | Flags |
| --- | --- | --- | --- |
| 0000 | AL | Always execute | — |
| 0001 | EQ | Equal | Z |
| 0010 | NE | Not Equal | !Z |
| 0011 | CS | Carry Set | C |
| 0100 | CC | Carry Clear | !C |
| 0101 | MI | Negative. | N |
| 0110 | PL | Positive or Zero | !N |
| 0111 | VS | Overflow | V |
| 1000 | VC | No Overflow | !V |
| 1001 | HI | Unsigned Higher | C·!Z |
| 1010 | LS | Unsigned Lower or Equal | !C+Z |
| 1011 | GE | Greater or Equal | N·V+!N·!V |
| 1100 | LT | Signed Less Than | N·!V+!N·V |
| 1101 | CT | Signed Greater Than - | !Z·(N·V+!N·!V) |
| 1110 | LE | Signed Less than or Equal | Z·(N·!V+!N·V) |
| 1111 | Reserved | Reserved | Reserved |

The CC-Selector field (bits 4 to 6) applies only to instructions on non-packed objects. The CC-Selector field designates the condition code in the CC register which is to be compared with the code in the Treg Byte.

In the described embodiment, the Side field (S-bit 7, X=0, Y=1) applies only to non-SIMD 64-bit instructions. For 32-bit operations the side is decided according to the channel in which the instruction is being executed, irrespective of what the side field is set to. For non-SIMD 64-bit instructions, the side field designates either left or right (X or Y) condition codes in the CC register.

Figure 5:
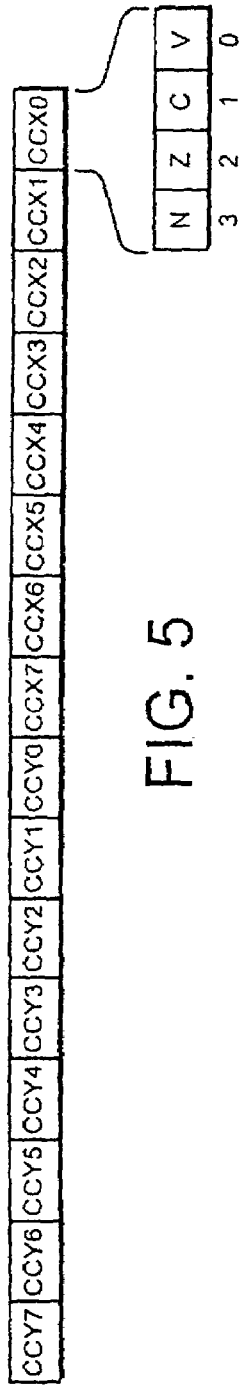
FIG. 5 illustrates the contents of a condition code register.

The Condition code register is 64 bits long and the bit fields are defined in FIG. 5. Each condition code is four bits long (a nibble).

Each CC{X,Y} {0 . . . 7} nibble has the four condition flags (NZCV) in that order. The condition codes can be set and used on a per lane basis.

SIMD byte (B) operations update 8 condition codes, X or Y depending on the side of the machine.

CC{X,Y} 0 . . . CC{X,Y}7

SIMD halfword (H) operations update four pairs of condition code as follows (again depending on the sides of the machine). That is, two condition codes are updated with the same value for each operation.

```
CCX0=CCX1              CCY0=CCYI

CCX2=CCS3              CCY2=CCY3
```

-continued

```
CCX4=CCX5              CCY4=CCY5

CCX6=CCX7              CCT6=CCY7
```

SIMD word (W) operations update two quads of condition codes, as follows (depending on the side of the machine). That is four condition flags are updated to the same value for each operation.

```
CCX0=CCX1=CCX2=CCX3    CCY0=CCY1=CCY2=CCY3

CCX4=CCX5=CCX6=CCX7    CCY4=CCY5=CCY6=CCY7
```

SIMD longword (L) operations update all eight condition codes as follows (depending on the side of the machine).

```
CCX0=CCX1=CCX2=CCX3=CCX4=CCX5=CCX6=CCX7

CCY0=CCY1=CCY2=CCY3=CCY4=CCY5=CCY6=CCY7
```

Use of the test register and condition code register will now be described with reference to the following examples. It will be understood that the following are examples only used to illustrate the principles of operation.

Consider the arithmetic operation ADD. This instruction can be implemented in a register-to-register format using format (1) in FIG. 3, or in a register-to-immediate format using format (2) of FIG. 3. Only the register-to-register format is described in detail in the following to illustrate the principles of the use of the test registers and the condition code register.

The instruction ADD has the following semantics:

ADD {B|H|W|L} {S} {Treg,} Dest, Src1, Src2.

Considering format (1) in FIG. 3, this instruction thus defines two source registers in the fields SRC1 and SRC2, each source register containing operands for the addition operation. If the instruction is ADDL, the registers are not packed but each contains a 64 bit object. For the ADDB, ADDH and ADDW instructions, each source register contains a number of packed objects according to the degree of packing defined earlier. It is assumed in the following example that each source register holds eight packed objects b0 . . . b7. A destination register DST is defined in the DST field of the instruction for holding the result of the addition operation. Eight packed objects are generated in the destination register. Assume for the time being that a single 32 bit operation is being effected by one channel (X or Y) of the processor.

Figure 6:
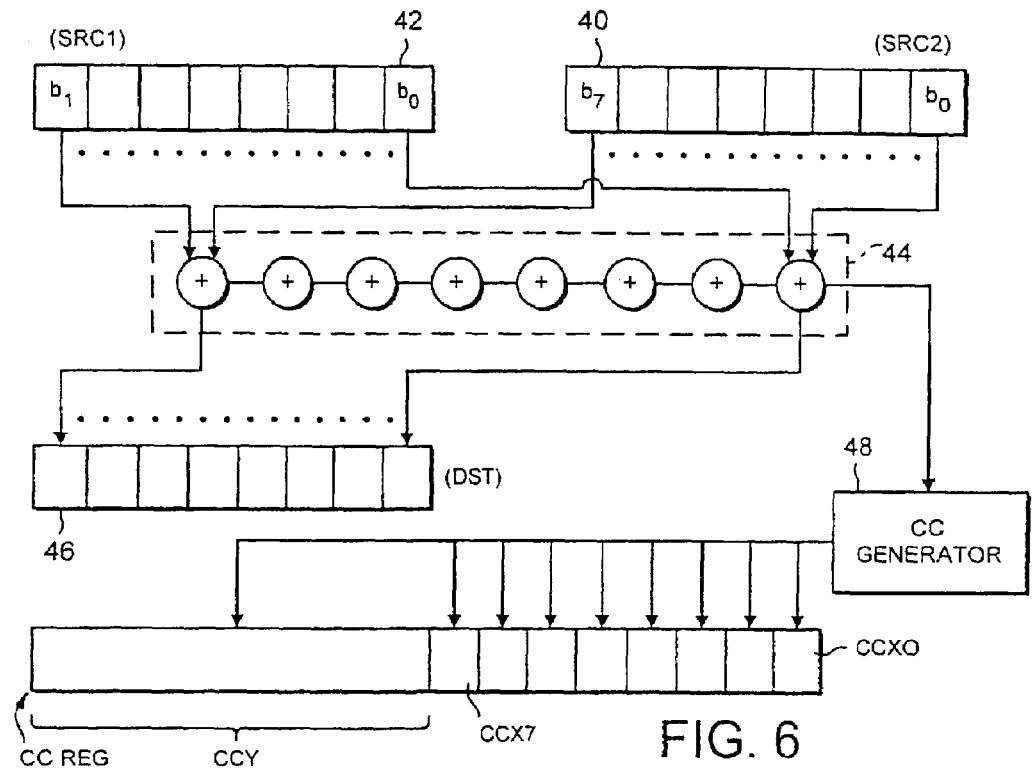
FIG. 6 is a diagram illustrating setting of condition codes.

FIG. 6 illustrates a diagram of one of the functional units which is capable of executing the ADD instruction. First and second 64 bit buffers 40,42 are provided for holding first and second source operands. In the illustrated example, the source operands contain eight packed objects $b_0$ to $b_7$ in each case. Addition circuitry 44 comprises eight operators, in this case addition circuits, each connected to receive two packed objects respectively from the same lane $b_0$ . . . $b_7$ of the input buffers 40,42. Only the connections of the first and last objects are shown. Similar connections apply to each of the other addition circuits. An output buffer 46 holds the result which is likewise in the form of eight packed objects for loading into the destination register specified in the instruction. A condition code generator 48 also examines the results of each addition and generates condition codes for the side of the machine where the instruction is being executed to be held in the condition code register CCreg. The condition generator 48 always generates eight condition codes for each side of the machine regardless of the degree of packing of the source operands, as described more fully in the following.

The instruction format (1) contains an S flag (bit 21). If this flag is set, then the condition codes for the side of the machine in which the instruction is being executed are set. Assume in this example that the instruction is being executed on the X side of the machine. The condition code generator 48 generates condition codes CCX0 to CCX7 by considering the results of the addition operations which were carried out on each packed object in the source registers and determining from those operations the values of N, Z, C and V which are the bits defining each condition code. In the example of FIG. 6, a different condition code can be generated for each condition code location CCX0 . . . CCX7 in the condition code register. Condition codes are set as follows. The N flag of the condition code is set if the result is negative, that is the top bit is set (event for unsigned inputs). The Z flag is set if the result is zero. The C flag is set if the operation generated an output carry. The V flag is set if the operation overflowed its range before being wrapped or saturated.

If the S flag in the instruction is not set, the condition register is not updated.

For the above explanation, it has been assumed that the addition operation was carried out. It is possible to predicate the ADD instruction itself on condition codes which have been set by an earlier instruction or instruction sequence. For this purpose, the instruction format contains a test register field TST (bits 18 to 20). These three bits allow one of the test register bytes Treg [1 . . . 7] to be addressed. If a test register byte is specified in the TST field of the instruction, then each condition code on the side of the machine where the instruction is being executed is checked against the condition code specified in the addressed Treg byte. If the TST field is set to zero, such that no Treg byte is specified, then the instruction always executes.

Figure 7:
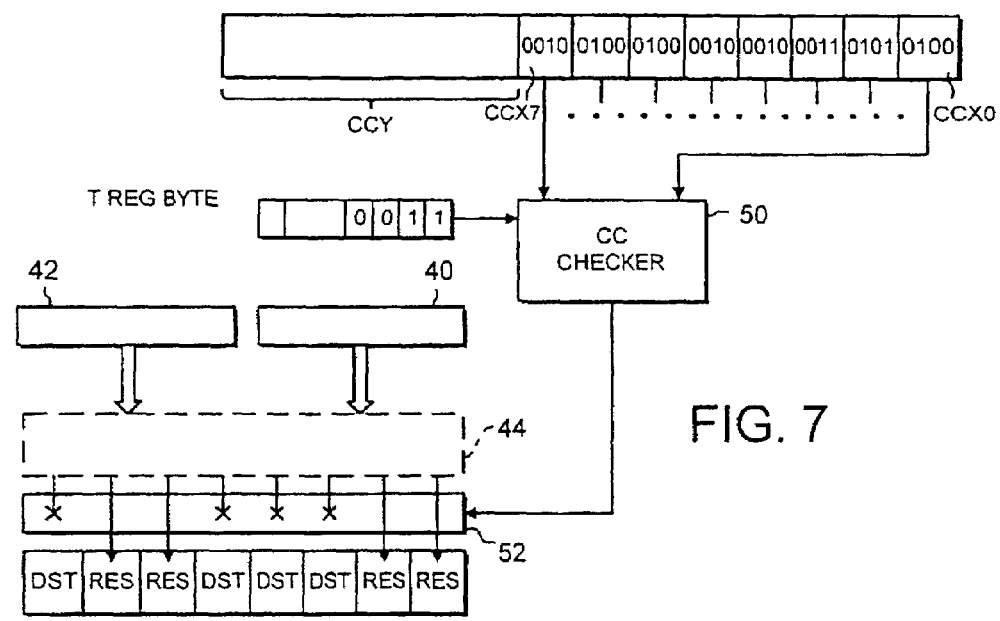
FIG. 7 is a diagram illustrating use of condition codes.

After comparing the test code specified in the addressed Treg byte with each of the condition codes CCX0 . . . CCX7 (assuming the operation is being executed on the X side of the machine), then the specified operation is carried out on the SIMD lanes where there is a match, and is not carried out on the SIMD lanes where there is no match. An example is illustrated in FIG. 7. Assume that the operation illustrated in FIG. 6 and described above has been carried out and that condition codes CCX0 to CCX7 have been set as described above depending on the results of the arithmetic operation in each of the SIMD lanes $b_0$ . . . $b_7$. It is assumed for this example that the condition codes are: $b_0$ 0010, $b_1$ 0101, $b_2$ 0011, $b_3$ 0010, $b_4$ 0010 $b_5$ 0100. This is illustrated in the condition code register in FIG. 7. Let us also assume that the addressed test register byte in the TST field of the instruction holds the condition code 0011. This denotes the condition Carry Set C. SIMD lanes $b_0,b_2,b_3,b_4$ satisfy this condition. Assume that the subsequent operation to be carried out is also an ADD instruction operating on the byte packed contents of two source registers SRC1, SRC2 with the results to be loaded into a destination register DST. Because a test register byte has been specified, the addition operation is only effected on the SIMD lanes where the condition code set for that lane (CCX0 . . . CCX7) satisfies the condition defined by the test code set in the addressed Treg byte. This is determined by a condition code checker 50. The output of the condition code checker 50 controls a set of switches 52, one for each SIMD lane $b_0$ . . . $b_7$. These switches control whether or not the results of the addition operation recited in the instruction update the values in the corresponding lane in the destination register DST. This is shown diagrammatically in FIG. 7, with a cross illustrating that the result of the addition operation does not get loaded into the destination register, and a through arrow illustrating that it does. This is denoted in the destination register by DST denoting an original byte in the destination register (that is prior to execution of the instruction), and RES denoting a result byte which, following execution of the instruction, is a result of the arithmetic operation on that lane.

As mentioned above, when an instruction is to be executed on less densely packed objects, for example H or W, eight condition codes are still set, in pairs or quads as mentioned above. Assume for example that an operation is carried out on halfword packed objects $h_0$ . . . $h_3$. The condition generator 48 determines condition code values by setting the N, C, Z and V flags as before for each SIMD lane. Thus, four condition code values are generated. These are used to set eight condition codes in the condition code register as condition code pairs as mentioned above. Once the condition codes have been set in the condition code register, they can be used in subsequent instructions operating on any degree of packing. For halfword packed objects, the first condition code CCX0 and every alternate condition code thereafter is checked against the test code in the addressed Treg byte to determine whether or not the instruction executes on that SIMD lane. For word packed objects, the first condition code and the fourth condition code is checked against the test code in the addressed Treg byte to determine whether or not the operation should be executed on that SIMD lane.

For long word operations, the first condition code CCX0 is evaluated. As described above, all condition codes for one side of the machine will have the same value set.

For non-SIMD instructions, that is instructions where the operands are not packed, the condition codes can still be used to determine whether or not the instruction is executed. In that case, the TST field of the instruction again identifies a Treg byte. The condition selector in the Treg byte identifies one condition code, which can be on the right or left sides. The side bit S denotes which side of the machine (X or Y). That is, any condition code out of the sixteen condition codes CCX0 . . . CCX7, CCY0 . . . CCY7 can be identified by the condition selector. The code held in the condition bits 0 to 3 of the Treg byte is then tested against the selected condition code to determine whether or not the instruction is executed. If the test condition is satisfied the instruction is executed. If not, the instruction is not executed.

From the above description it will be appreciated that although the processor has right and left sides (X and Y channels), the condition code register is accessible from both sides. For 32 bit operations, condition codes are set and accessed according to the side of the processor which is actually processing the 32 bit operation. Thus, 32 bit operations processed in the X channel $5_X$ update the condition codes for the X channel CCX0 . . . CCX7, and are executed conditionally only on the X channel codes CCX0 . . . CCX7. Similarly, for 32 bit operations being executed in the Y channel $5_Y$. However, 64 bit operations have greater flexibility. The 64 bit instructions also include a TST field for accessing a Treg byte in a manner similar to the 32 bit operations discussed above. In that case, the side field S in the accessed Treg byte determines which condition codes (X or Y) are used. That is, the side field S determines both which condition codes are set pursuant to a 64 bit instruction being executed and, also, on which condition codes (X or Y)

operation of the 64 bit instruction is predicated. Thus, this considerably increases the options available on the execution of 64 bit instructions.

The description above provides an outline of the processor structure. The important features of this design are the two processor lanes (the right and left sides of the architecture) which can operate in parallel independently, and with different instructions. Furthermore, the processors can operate on lanes using the SIMD principle.

Figure 8:
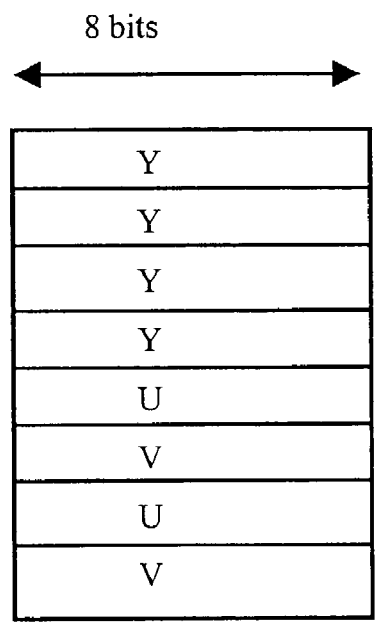
FIG. 8 is a diagram illustrating the YUV 4:2:2 data format.

The invention uses this architecture for processing YUV data (more generally data representing pixel colour as a luminance component and colour difference components). FIG. 8 shows a 64 bit block of pixel colour data in YUV 4:2:2 form. One useful property of this data block is that an equal number of luminance bits and colour difference bits are present in the block. The block provides colour data for eight pixels.

Figure 9:
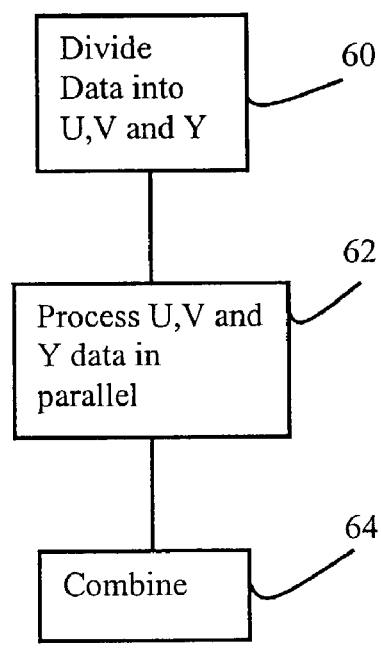
FIG. 9 is a flow chart illustrating the method of the invention.

In accordance with the method of the invention, the data is divided into first and second data portions, the first data portion comprising the luminance components (Y) and the second data portion comprising the colour difference components (U,V). This is shown as step 60 in the flow chart of FIG. 9. Each data portion is then processed by one side of the processor architecture in step 62, using instructions selected taking into account the nature of the Y and U,V data. For example, it is well known to provide different instruction codes for operating on signed and unsigned data. After operating on the data, the Y and U,V components are recombined in step 64 into the required standardised format for driving a display or for storage in memory. The processing of the data will typically comprise compression, decompression or filtering operations.

To fill the 64 bit operand capacity of each RISC processor, the data components are arranged in lanes. One 64 bit word of course can carry the Y or U,V data for 8 pixels in the case of 4:2:2 YUV data.

It will be understood that a number of variations are possible to the embodiment described above. For example, the Side bit S in the Treg byte can be used always to denote the required set of condition codes (X or Y), rather than only in non-SIMD 64-bit instructions as mentioned above. Also, there is no need for a specific condition set flag S in the instruction—whether or not condition codes are to be set can be defined in the opcode or the instruction semantics can be such that condition codes are always set.

Considering FIG. 7, it is possible to implement conditional lane-by-lane execution in a number of ways. Another alternative to that described would be to perform the operation (and power-up the respective operators) only when the test condition is satisfied for that lane.

The "Firepath" processor architecture has been described in numerous other patent applications assigned to the assignee of this application. These include GB 2355084, GB 2352308, GB 2352066, GB 2352065 and GB 2352536. These are all incorporated herein by way of reference material.

We claim:

1. A method of processing data representing pixel colour, the data for each pixel being arranged as a luminance component and colour difference components, wherein the method comprises:

dividing the data into first and second data portions, the first data portion comprising the luminance components and the second data portion comprising the colour difference components;

deriving first and second instructions from a combined instruction word;

processing the first and second data portions in parallel using first and second parallel processors within a processor architecture, the first and second parallel processors operating according to the first and second instructions, respectively; and combining the processed first and second data portions to provide processed pixel colour data;

wherein the luminance components are arranged in lanes of an operand to which an instruction is to be applied in the first processor, and the colour difference components are arranged in lanes of an operand to which an instruction is to be applied in the second processor.

2. A method as claimed in claim 1, wherein the successful execution of each combined instruction word requires both parallel processors to complete their respective instructions.

3. A method as claimed in claim 1, wherein the data comprises 4:2:2 YUV data.

4. A method as claimed in claim 3, wherein the first and second parallel processors operate on 64 bit operands, and wherein each operand for the first processor comprises eight 8 bit Y luminance components, and each operand for the second processor comprises four 8 bit U colour difference components and four 8 bit V colour difference components.

5. A method as claimed in claim 1, wherein the luminance components comprise unsigned binary words and the colour difference components comprise signed binary words.

6. A method as claimed in claim 5, wherein different instructions are applied by the two processors to the signed and unsigned words.

7. A computer system for processing data representing pixel colour, comprising:

a processor architecture comprising first and second parallel processors; and code for:

dividing the data into first and second data portions, the first data portion comprising luminance components and the second data portion comprising colour difference components;

deriving first and second instructions from a combined instruction word;

instructing the first processor to process the first data portions using the first instruction and instructing the second processor to process the second data portions using the second instruction;

wherein the luminance components are arranged in lanes of an operand to which an instruction is to be applied in the first processor, and the colour difference components are arranged in lanes of an operand to which an instruction is to be applied in the second processor.

8. A system as claimed in claim 7, wherein the first and second parallel processors comprise RISC (reduced instruction set computer) processors.

9. A system as claimed in claim 8, wherein each RISC processor operates on 64 bit operands.

10. A computer program for implementing the method of claim 1 when controlling the processor architecture.

11. A storage medium storing the program of claim 10.

* * * * *